United States Patent [19]
Williams

[11] Patent Number: 6,061,305
[45] Date of Patent: May 9, 2000

[54] DEVICE TO MEASURE AVERAGE TIMING PARAMETERS

[75] Inventor: Robert Alan Williams, Cupertino, Calif.

[73] Assignee: Advanced Micro Devices, Inc., Sunnyvale, Calif.

[21] Appl. No.: 08/882,366

[22] Filed: Jun. 25, 1997

[51] Int. Cl.[7] .............................. G04F 8/00; G04F 7/00
[52] U.S. Cl. .......................................... 368/113; 364/569
[58] Field of Search ............................. 368/10, 107–113; 364/565; 377/15, 20

[56] References Cited

U.S. PATENT DOCUMENTS

| | | | |
|---|---|---|---|
| 4,034,353 | 7/1977 | Denny et al. | 364/200 |
| 4,051,355 | 9/1977 | Lin | 235/302.3 |
| 4,199,817 | 4/1980 | Conkling et al. | 364/734 |
| 4,385,235 | 5/1983 | Hastings | 250/262 |
| 4,455,617 | 6/1984 | Dolikian | 364/724 |
| 5,790,560 | 8/1998 | Durham et al. | 371/22.1 |

*Primary Examiner*—Vit Miska
*Attorney, Agent, or Firm*—Fiesler, Dubb, Meyer & Lovejoy LLP

[57] ABSTRACT

A device for the measurement of and determination of the average duration of a series of N related events. A device in accordance with the invention utilizes count and load circuitry to determine an average. Dividing a binary number by an integer multiple of 2 ($2^m$) is the same as shifting the binary number m bits to the right. Thus, a device in accordance with the invention performs a summation of the cumulative length of the N events by utilizing an n-bit counter which counts during the duration of each event. Division is performed by loading into a register the n–m most significant bits of the value held in the n-bit counter after the occurrence of N events.

1 Claim, 3 Drawing Sheets

DEVICE TO MEASURE AVERAGE TIMING PARAMETERS

BACKGROUND OF THE INVENTION

1. Field of Invention

The present invention relates to measuring duration times of each of a series of events and particularly to determining the average event duration time.

2. Related Art

Many electronic devices are designed to be used with a variety of systems. For instance, a personal computer add-in card may be used in a "fast computer" or a "slow computer." Because of their use in a variety of systems whose characteristics are often unknown to the electronic device manufacturer, the performance of each electronic device cannot generally be optimized for each system in which the electronic device would possibly be used. Rather, each device is designed with characteristics which are suitable for use in a variety of systems, making performance satisfactory, but not optimal for each system.

Variations in environment not only occur from system to system, but may also occur intrasystem. For instance, when different computer programs are executed, the system loads can vary, causing response time variations within a single system. Thus, even an electronic device designed with certain hardware specifications in mind cannot be optimized by a manufacturer for ideal performance on a system that executes a variety of programs.

If various parameters subject to change are measured in an environment in which an electronic device is placed, the electronic device can be adjusted so that performance of the electronic device is optimized for that environment. Such parameters may include variation in response times or load changes. Moreover, because parameters of interest can vary from instance to instance within a single system, such measurements should be taken over several instances and averaged to find a value that will be most useful in optimizing device performance. However, manual measurement and/or adjustment of these parameters can simply be too burdensome for a typical electronic device user, and, at the very least, extremely inconvenient for either the user or the device installer.

Thus it is desirable to design a device that automatically measures various system parameters, and provides a value that can be used by an electronic device to evaluate system characteristics, enabling the electronic device to adjust itself and optimize performance.

Further, it is desirable to design a device that provides an average value determined over several measured instances. However, averaging circuitry generally requires complicated adding and dividing circuits, often requires significant board space, and can influence other factors as well (e.g., power, etc.). Thus, it is desirable to design a device that determines an average value using minimized, simple circuitry.

SUMMARY OF THE INVENTION

The invention is generally directed toward determining the average duration of a series of related events and doing so utilizing relatively simple circuitry. To this end, a device in accordance with the invention utilizes count and load circuitry to perform measurement and averaging functions. Specifically, a device in accordance with the invention utilizes a means for generating a load signal when N events have occurred. In one embodiment, such means is a divide-by-N counter. Also used by a device in accordance with the invention is a means for tracking the cumulative length of time of the N events and producing an n-bit cumulative length value signal indicative of the cumulative length of time. In one embodiment of the invention, such a means for tracking is a simple n-bit counter which counts the number of clock cycles occurring during the duration of each event without resetting or clearing between events. Finally, a device in accordance with the invention utilizes means for producing an average event duration signal generated from the most significant bits of the cumulative length value signal upon the occurrence of the load signal (i.e., after the occurrence of N events).

Finding an average event duration is the same as dividing the cumulative length value by N. When N is an integer power of 2 ($N=2^m$), division of a binary number by N is the same as shifting the binary number m bits to the right. Thus, an average event duration value is found by loading into an output register only the n−m most significant bits of the cumulative length value signal.

Thus, the summing portion of an averaging function is performed by a count function while the division portion of the averaging function is performed by a load to a register in one embodiment of the invention. Such an average value is useful for an electronic device in determining how to adjust various parameters for optimizing performance.

BRIEF DESCRIPTION OF THE DRAWINGS

The present invention is described with respect to particular exemplary embodiments thereof and reference is accordingly made to the drawings in which.

DETAILED DESCRIPTION

In accordance with the invention a device for measuring average timing parameters is disclosed. A device in accordance with the invention provides for automatic measurement of average timings, which in turn allows an electronic device to automatically adjust various parameters and optimize its performance.

Figure 1:
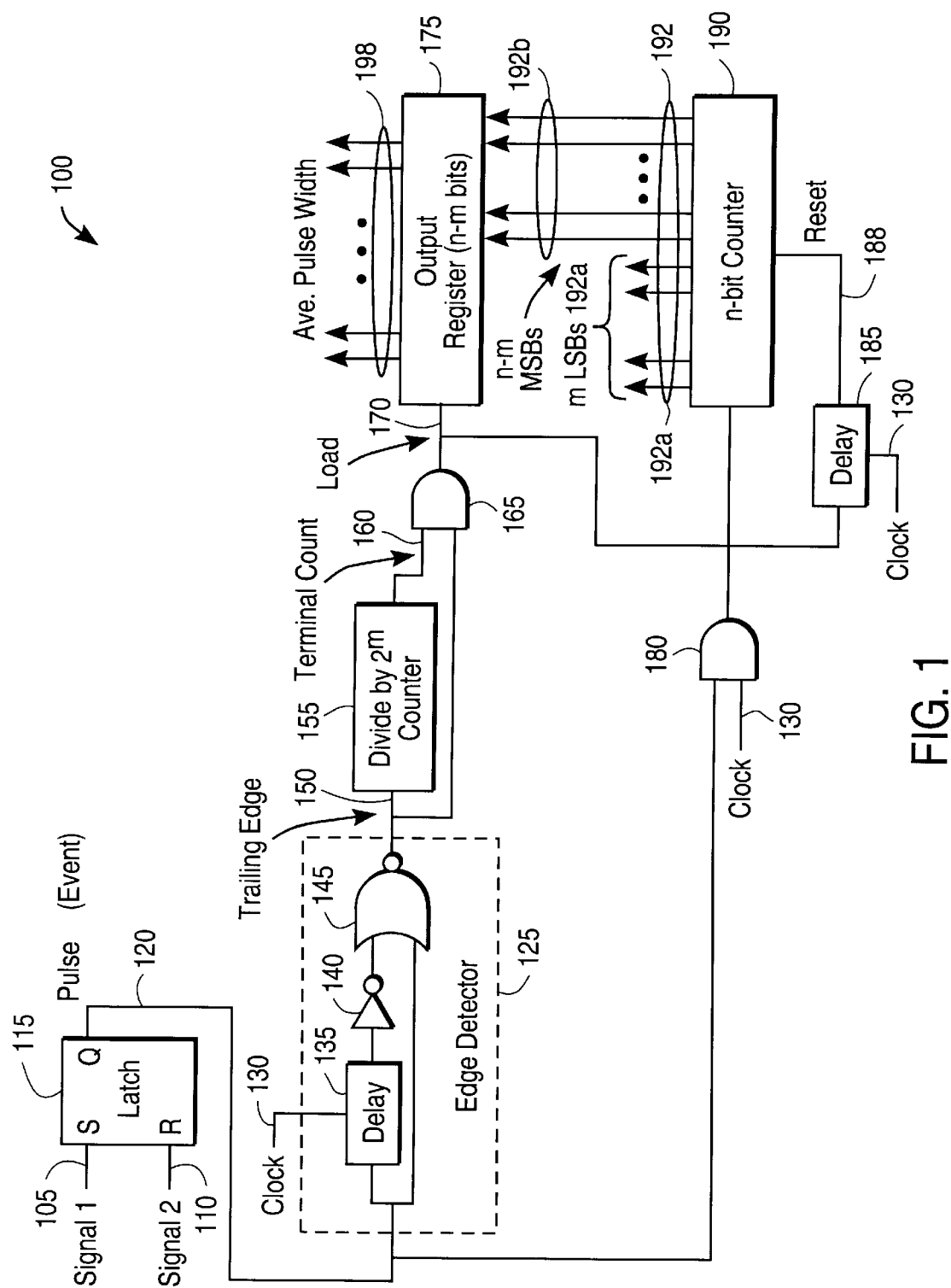
FIG. 1 illustrates a circuit diagram of one embodiment of a device in accordance with the present invention.
Figure 2:
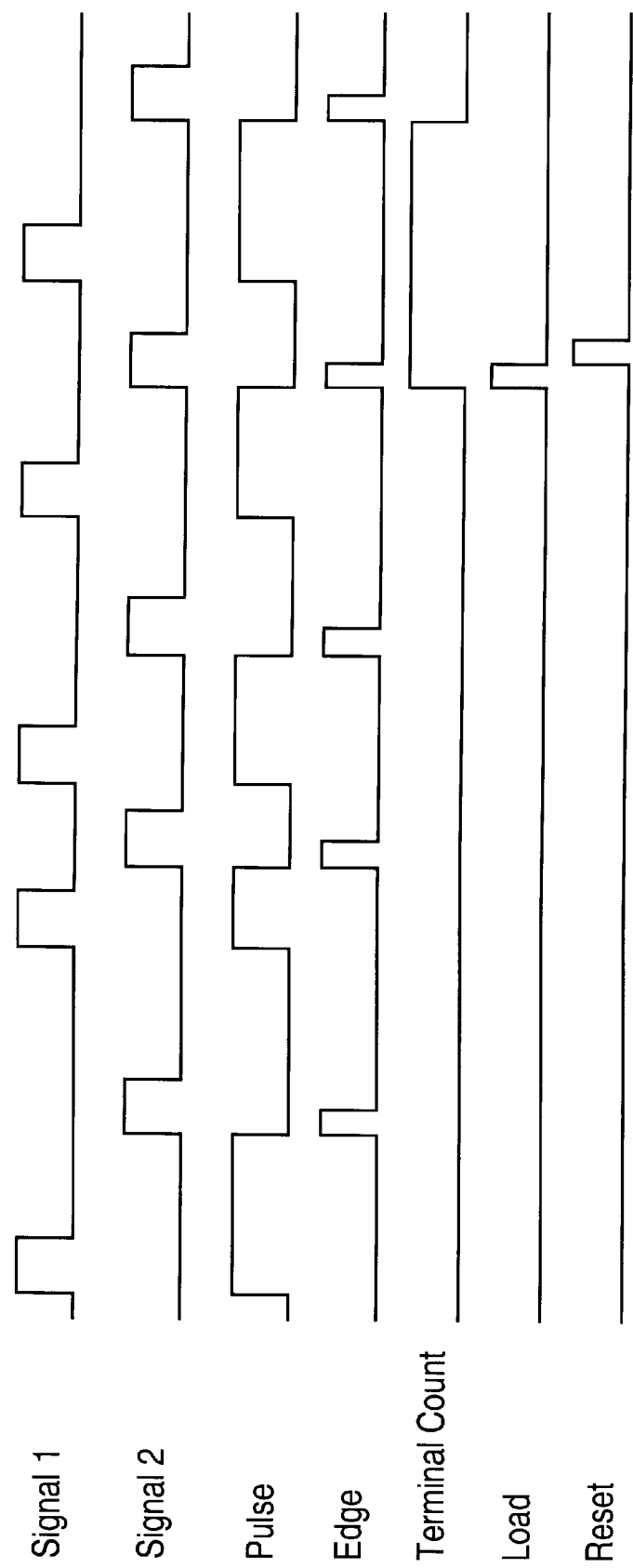
FIG. 2 illustrates a timing diagram of various signals generated by the circuit of FIG. 1.

Referring to FIGS. 1 and 2, an embodiment in accordance with the invention is herein described. FIG. 1 shows a system 100 for finding the average duration time of a recurring event, defined as the time period between two occurrences. In the embodiment shown in FIG. 1, the event defining occurrences are the receipt of signal 1 on line 105 and the receipt of signal 2 on line 110. On the assertion of a signal 1 on line 105 to latch 115, an output signal is asserted on line 120 from latch 115. When signal 2 is asserted on line 110 to latch 115, the output signal from latch 115 on line 120 is de-asserted. In this manner, and as shown in FIG. 2, the event defined by the delay between signal 1 and signal 2 is converted into a pulse that goes to a logical high on the assertion of signal 1 and to a logical low on the assertion of signal 2. Signal 1 and signal 2 may be asserted in response to a wide variety of circumstances, including for example, an interrupt request (signal 1) and a signal indicating the start of an interrupt service routine (signal 2). Another example is a DMA request (signal 1) and a DMA acknowledge signal (signal 2).

Other embodiments of the invention may receive an input pulse by other methods. For instance, a variable width pulse may be received directly on line 120, rather than having two distinct signal lines, eliminating the need for latch 115. Where a variable width pulse is received directly, the event defining occurrences are the assertion of the pulse and the deassertion of the pulse. Alternatively, event defining occurrences can be converted into pulses in a variety of other ways and will be generally known to those with skill in the art.

The pulse on line 120 is then used to gate the clock on line 130 with AND gate 180 into an n-bit binary counter 190. When the signal on line 120 is "high", the clock will be passed to n-bit counter 190. When the signal on line 120 is "low", the clock will effectively be blocked from reaching n-bit counter 190. In this manner, the clock signal to n-bit counter 190 is effectively turned "on" and "off" with the pulse on line 120. Other methods of turning a clock on/off known to those with skill in the art will also be suitable in other embodiments of the invention. When the clock signal to counter 190 is "on", counter 190 will count the number of clock cycles that occur during the duration of the pulse signal on line 120. When the clock signal to counter 190 is turned "off", counter 190 holds the last count it completed as a value asserted on lines 192.

Upon a second assertion of a signal 1, a second pulse will be asserted on line 120 and counter 190 will continue to count from the value it is holding (the counter is not cleared) until the second pulse is de-asserted by a second assertion of a signal 2. In this manner, counter 190 acts as an accumulator, storing the cumulative length of time of each event as defined by the first pulse, the second pulse, and each pulse thereafter (e.g., length of pulse1+length of pulse2+ . . . +length of pulseN).

The pulse signal on line 120 is also the input to edge detector 125. As shown in FIG. 2, the edge detector 125 generates a 1-clock wide signal at the trailing edge of the input pulse on line 120. The edge detector 125 includes a delay unit 135 coupled to an inverter 140 which in turn is coupled to a first input of NOR gate 145. The second input of NOR gate 145 is coupled to line 120. Delay unit 135 receives a clock input 130 and may be implemented with digital logic, such as a flip-flop, or with analog circuitry. An edge detector can be implemented in other embodiments of the invention in a variety of other fashions known to those skilled in the art. For instance, a differentiator circuit may also be suitable.

The trailing edge signal produced by edge detector 125 on line 150 is input into a divide-by-N counter 155, where N is an integer power of 2 (N=$2^m$). The divide-by-N counter 155 produces a terminal count signal on line 160 every Nth count, i.e., every N (or $2^m$) pulses. The terminal count signal on line 160 is input into AND gate 165, in conjunction with the trailing edge signal on line 150, to produce a load signal one clock in length on line 170 at the end of N pulses, as shown in FIG. 2. Other embodiments of the invention may eliminate AND gate 165, feeding the terminal count signal as a load signal directly to output register 175 as well as delay element 185 (discussed below).

At the end of N pulses when the load signal is asserted, the value held in n-bit counter 190 on lines 192 is the sum of the lengths of N pulses obtained by cumulatively counting the number of clock cycles occurring during the duration of each pulse. To calculate the average duration of N events, the value held on lines 192 must be divided by N, the number of pulses (where each pulse represents an event).

Since N is an integer power of 2 ($2^m$), dividing a binary number (e.g., the value on lines 192) by N is equivalent to shifting the binary number m bits to the right. In the device of FIG. 1, such division is accomplished by loading the n–m (n minus m) high order bits 192$b$ of n-bit counter 190 into register 175 upon the assertion of the load signal on line 170 (i.e., upon N event occurrences). The m low order bits 192$a$ are ignored, discarded, or otherwise not utilized by register 175. Thus, the value loaded into output register 175 represents the sum of the lengths of the pulses on line 120 divided by $2^m$. In other words, the value loaded into output register 175 is the average duration time of N events (e.g., the average pulse length). This average value is then output from register 175 on lines 198. Other embodiments in accordance with the invention may load or otherwise obtain the most significant bits 192$b$ for output in other ways known to those of skill in the art.

One clock cycle after the load signal on line 170 is asserted, the n-bit counter 190 is cleared to a count of 0 so that it can start accumulating data for the next $2^m$ events. Delay element 185 is optionally used to delay the load signal by one clock cycle and can be implemented digitally, for instance with a flip-flop, or by other methods of inserting a delay known to those with skill in the art.

Various values used in embodiments of the invention should be carefully chosen. For instance, because the clock determines the resolution of measurement, the clock cycle time should be much shorter than the shortest time to be measured. The value of m should be large enough so that enough events will be measured to get a meaningful average. While m is fixed in advance in the embodiment of FIG. 1, m could be varied by programming or other means in other embodiments of the invention. The value of n is chosen so that n–m, the number of bits output by the output register, is long enough to hold the longest expected average response time. For instance, if it is expected that the largest average value will be 1000 clocks, then n–m (the number of output bits of register 175) should be 10 ($2^{10}$=1024).

Thus a device has been described where an average value can be found using count and load functions. The summing portion of the averaging function is provided by n-bit counter 190, which counts, and effectively adds by continued counting without clearing, the number of clock cycles occurring during the duration of each pulse. The division portion of the averaging function is accomplished by loading the most significant bits of the count held by the n-bit counter.

Figure 3:
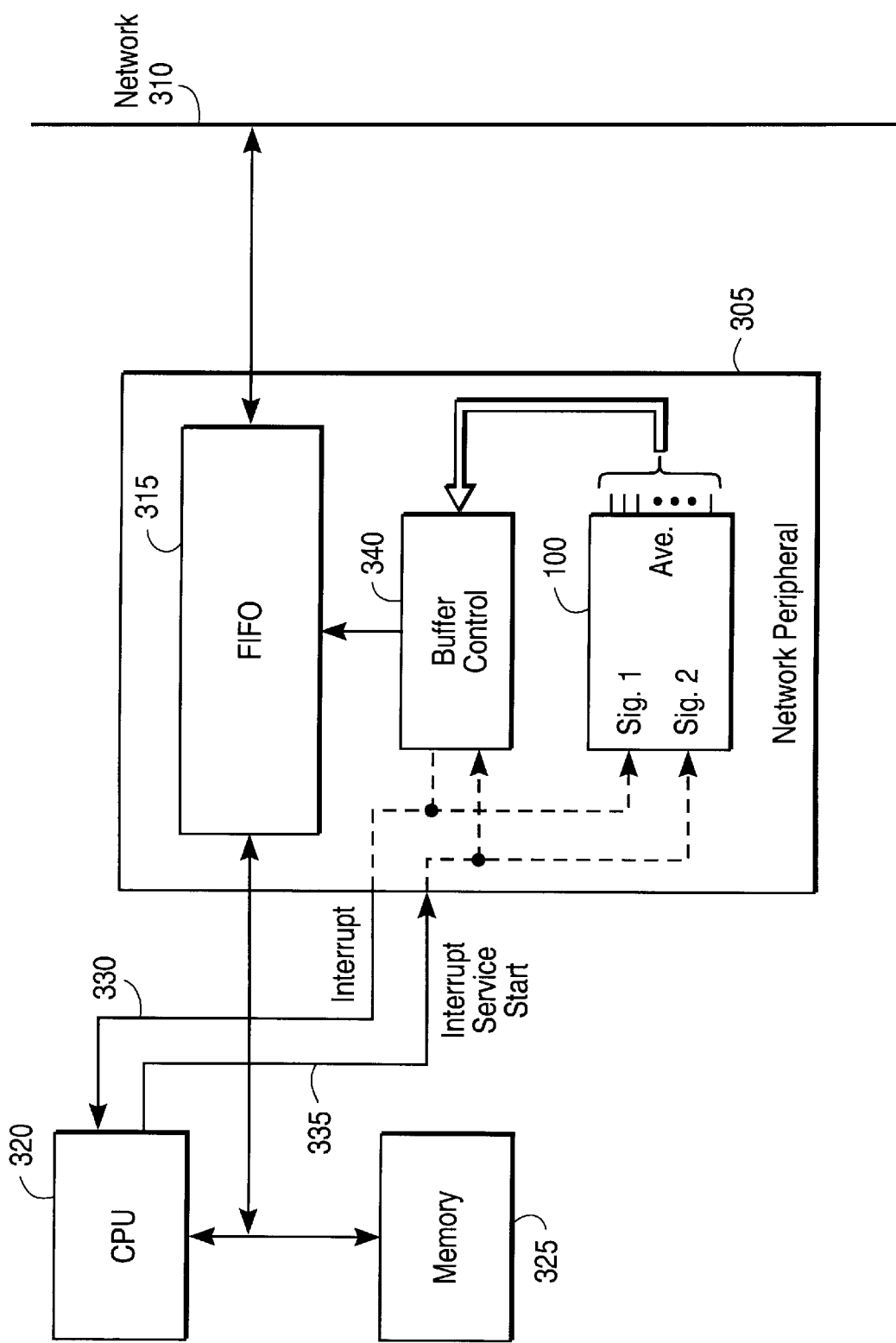
FIG. 3 illustrates one application in which an embodiment of the invention is useful.

One situation where knowledge of average event duration times would be especially useful is in using a network peripheral, such as an ethernet controller, to transfer data between a network and a CPU bus, as shown in FIG. 3. Further details of a network peripheral which makes use of an embodiment of the present invention can be found in U.S. application Ser. No. 08/882,604, entitled Information Packet Reception Indicator for Reducing the Utilization of a Host System Processor Unit, by Joseph A. Brcich, David G. Roberts, and Robert Williams and filed on Jun. 25, 1997.

The network peripheral 305 takes data in at one data rate, e.g., the network rate, and outputs data at a second rate, e.g., the CPU bus rate. Because of the two data transfer rates as well as the somewhat "bursty" nature of network activity, the network peripheral of FIG. 3 utilizes a FIFO (first in first out) mechanism as a buffer between the network and CPU bus, which alleviates problems caused by constant signal traffic at differing data rates.

Data from the network 310 is input into the FIFO 315 at a first data rate. When data is available for transfer, the buffer control unit 340 of network peripheral 305 sends the CPU 320 an interrupt signal on line 330. After the CPU receives the interrupt, the CPU executes an interrupt service routine in which the CPU 320 copies the data from the FIFO 315 into memory 325 for later use. Upon the initiation of the interrupt service routine the CPU will assert a signal 335, which can alert network peripheral 305 that such routine has been initiated.

The timing during which the CPU copies the data from the FIFO to memory depends on several system latencies, including DMA latency. Ideally, the interrupt 330 from the network peripheral 305 should be sent to the CPU 320 at a time such that the wait time and other latencies experienced by the CPU 320 are minimized, i.e., the CPU should copy the last byte of data from the FIFO just after it arrives in the FIFO. If copying is started too soon, the CPU will have to wait for the last bytes of data to be transferred into the FIFO 315 from the network 310 before they can be copied and CPU cycles will be wasted waiting for the data. If the interrupt is sent too late, the information the system needs (e.g., information that the CPU's system has requested) is delayed, causing the CPU's system to operate more slowly. By the network peripheral's determining the average time it takes the CPU to initiate its interrupt-service routine (signal 2) 335 after receiving an interrupt (signal 1) 330, the timing of an interrupt signal to the CPU can be sent at an optimized time, minimizing both CPU and system wait time.

The above is only demonstrative of one example of an application where an embodiment of the invention may be useful. Other examples of average measurement values which may be useful in optimizing a system can include bus latency times or CPU bus acquisition times. Further, an embodiment of the invention may also be useful with hard disk or floppy disk controllers. Other examples of useful parameters to measure in various device applications will be obvious to those with skill in the art. Further, it will be obvious that the signal output on lines 198 can be accessed and used by a single device or by multiple devices.

It should be understood that the particular embodiments described above are only illustrative of the principles of the present invention, and various modifications could be made by those skilled in the art without departing from the scope and spirit of the invention. For instance, while the invention has been described with reference to various hardware devices, it is to be understood that the principles of the invention could be incorporated in software and/or firmware as well. Thus, the scope of the present invention is limited only by the claims that follow.

What is claimed is:

1. A network peripheral for controlling communications between a network, which transfers data at a first rate, and a system, which system transfers data at a second rate, comprising:

a data buffer for storing data for transfer;

buffer controlling means operatively coupled to said data buffer for controlling the transfer of data to and from said data buffer, said buffer controlling means further for generating N first signals to said system, and said buffer controlling means for receiving N second signals from said system, where the time period between the i'th first signal and the i'th second signal defines an i'th event, $i=(1 \ldots N)$;

average event duration determining means, operatively coupled to said buffer controlling means, for determining the average duration of N events and including, means for generating a load signal when N events have occurred, where $N=2^m$, m is an integer, means for tracking the cumulative length of time of said N events and for producing a cumulative length value signal of n bits in length, and means for producing an average event time signal generated from the (n−m) most significant bits of said cumulative length value signal upon receipt of said load signal.

\* \* \* \* \*